(12) United States Patent
Beninghaus et al.

(10) Patent No.: US 8,185,165 B2
(45) Date of Patent: *May 22, 2012

(54) METHOD AND APPARATUS FOR ADAPTIVE POWER SAVING IN A MOBILE COMPUTING DEVICE

(75) Inventors: James Beninghaus, Campbell, CA (US); William Ngo, Fremont, CA (US); Welly Kasten, Sunnyvale, CA (US); Neil Hendin, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

This patent is subject to a terminal disclaimer.

(21) Appl. No.: 12/475,961

(22) Filed: Jun. 1, 2009

(65) Prior Publication Data

US 2010/0304794 A1 Dec. 2, 2010

(51) Int. Cl.
*G06F 15/16* (2006.01)

(52) U.S. Cl. .................................. 455/574; 370/311
(58) Field of Classification Search ............. 455/572, 455/574, 512, 513, 522; 370/311
See application file for complete search history.

(56) References Cited

U.S. PATENT DOCUMENTS

2009/0022078 A1* 1/2009 Patterson et al. ............. 370/311
2009/0243873 A1* 10/2009 Mizukawa et al. ...... 340/825.22

* cited by examiner

*Primary Examiner* — Sam Bhattacharya (57) ABSTRACT

A mobile computing device is described that includes one or more wireless transceivers, a data traffic monitor module operative to monitor one or more wireless communications parameters, and a power management module operative to select a power mode for the mobile computing device based on the one or more wireless communications parameters. In various embodiments, the power mode comprises an extended power save mode wherein the one or more wireless transceivers are disabled during a plurality of consecutive wireless beacon events. Other embodiments are described and claimed.

20 Claims, 7 Drawing Sheets

METHOD AND APPARATUS FOR ADAPTIVE POWER SAVING IN A MOBILE COMPUTING DEVICE

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., e-mail) with a desktop computer, and so forth, mobile computing devices also typically include wireless communications capabilities to provide features, such as mobile telephony, mobile e-mail access, web browsing, and content (e.g., video and radio) reception. Exemplary wireless communications technologies include cellular, satellite, and mobile data networking technologies.

Providing such a wide array of functionality in a single device results in increased power requirements. As the amount of power required to provide the ever increasing array of capabilities continues to increase, conservation of power becomes an important consideration. As a result, it is desirable to adapt the power consumption of a mobile computing device, when possible, to conserve power. For example, it may be advantageous to adaptively enter and control different power saving modes to conserve system power based on a variety of wireless communication parameters. Consequently, there exists a substantial need for techniques to improve the management of power within a mobile computing device.

DETAILED DESCRIPTION

Various embodiments may be generally directed to power management techniques for a mobile computing device, such as a smart phone. Some embodiments may be particularly directed to selecting a power mode for a mobile computing device based on one or more monitored wireless communications parameters.

In one embodiment, for example, a mobile computing device may include a data traffic monitor module, a power management module and one or more wireless transceivers. In various embodiments, the data traffic monitor module may be operative to monitor one or more wireless communications parameters for the mobile computing device. Examples of wireless communications parameters may comprise one or more application or protocol demands for the mobile computing device, for example. In some embodiments, the power management module may be operative to select a power mode for the mobile computing device based on the one or more wireless communications parameters. The power mode, in various embodiments, may comprise an extended power save mode wherein the one or more wireless transceivers are disabled during a plurality of consecutive wireless beacon events. A beacon event may comprise a transmitted frame or packet from an access point or any other network device, such as a router, switch, gateway, etc., that identifies the access point and/or the wireless device/network and generally includes information regarding characteristics of the access point and/or wireless device/network. Other embodiments are described and claimed.

Improving the power management of a mobile computing device may provide several advantages. For example, reducing the amount of power required by the mobile computing device when application and protocol demands decrease may result in improved system performance and extended battery life. Furthermore, increasing the time for which the wireless transceivers and other suitable components may be powered off during times of reduced wireless activity may also improve the power management and system performance of the mobile computing device. Additionally, implementing the power management techniques in a dynamic manner may limit the change in user experience as power may be increased as wireless demands increase. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals. Other embodiments are described and claimed.

Figure 1:
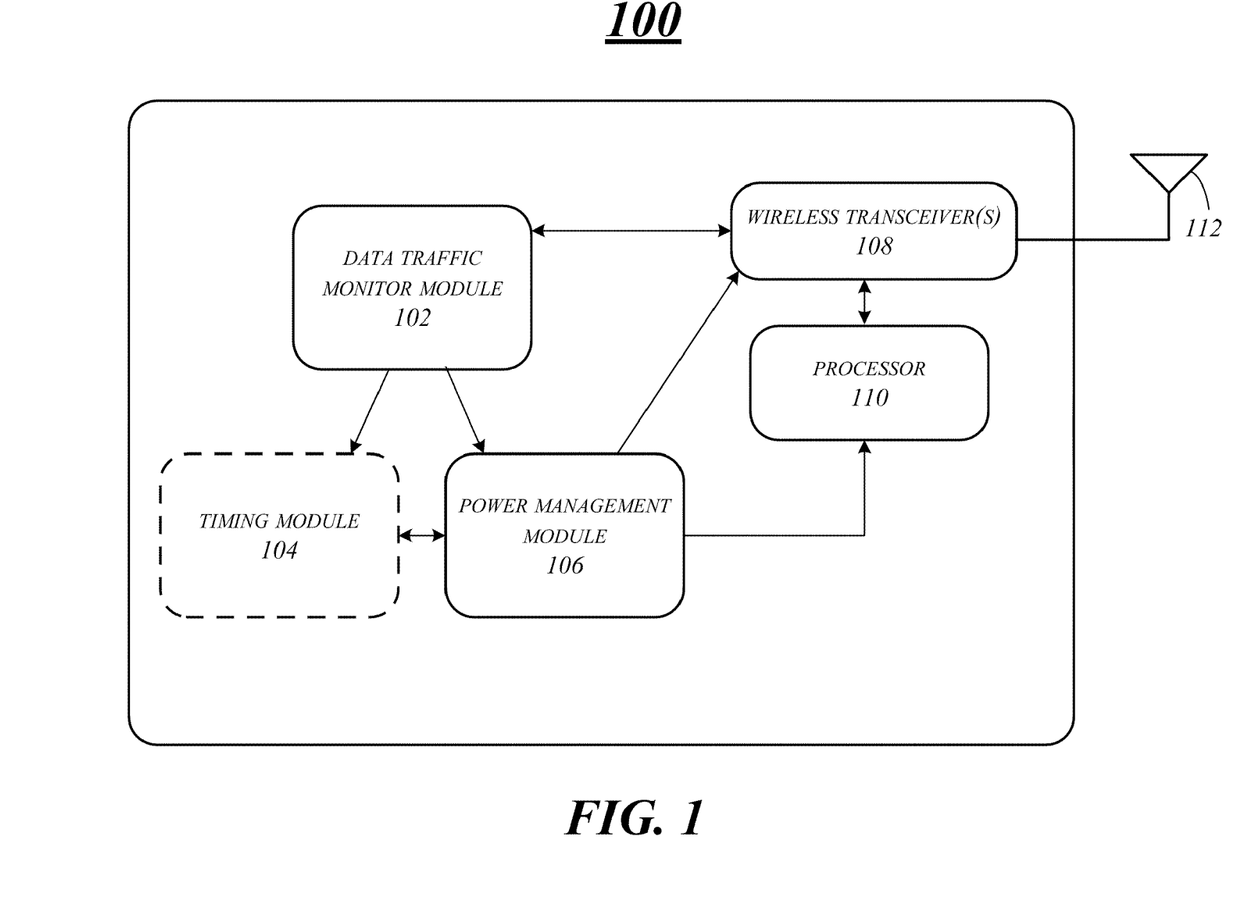
FIG. 1 illustrates one embodiment of a first mobile computing device.

FIG. 1 illustrates one embodiment of a mobile computing device. In particular, FIG. 1 shows a first embodiment of a mobile computing device 100. The mobile computing device 100 may include by way of example and not limitation a data traffic monitor module 102, a timing module 104, a power management module 106, one or more transceivers 108, a processor 110 and one or more antennae 112. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Pre™ smart phone. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 5.

In various embodiments, mobile computing device 100 may include one or more wireless transceivers 108. Wireless transceivers 108 may comprise combination transmitters and receivers for wireless communication. In some embodiments, mobile computing device 100 may include separate or combined transceivers 108 for providing cellular, Wi-Fi, WLAN, Bluetooth, or any other type of wireless communication technology. The one or more transceivers may be configured to transmit or receive wireless data or other wireless signals using antenna 112 in some embodiments. The antenna 112 may comprise or be implemented as one or more internal antennas and/or external antennas. Other embodiments are described and claimed.

Mobile computing device 100 may also include a data traffic monitor module 102 in various embodiments. The data traffic monitor module 102 may be operative to monitor one or more wireless communications parameters for the mobile computing device 100. In various embodiments, the one or more communications parameters may comprise one or more of application or protocol demands for the mobile computing device 100. For example, the wireless communications parameters may comprise throughput, latency, power requirements, type of wireless traffic, type of wireless connection, signal strength, or any other wireless communications parameters that have an effect on the power performance of mobile computing device 100.

In various embodiments, the data traffic monitor module 102 may monitor the data traffic carried over a wireless radio stack and/or one or more transceivers 108 of mobile computing device 100 and determine when and at what level to set power consumption by the wireless radio and/or the one or more transceivers 108. For example, data traffic monitor module 102 may track the application and protocol demands on the wireless radio link of mobile computing device 100. The tracked demand may be associated with the normal TCP/IP socket interface as well as other protocols, including ICMP, DHCP, ARP, Connection Manager and 802.11 link management frames. Other embodiments are described and claimed.

In some embodiments, as the application and protocol demands on the wireless radio link and/or the one or more transceivers 108 change, the data traffic monitor module 102 may notify a power management module 106. Power management module 106 may be operative to select a power mode for the mobile computing device 100 based on the one or more wireless communications parameters in various embodiments. In some embodiments, power management module 106 may select an appropriate power level or power mode for mobile computing device 100 that matches the throughput, latency, and available battery power required by mobile computing device 100. For example, when applications and protocols are actively sending and receiving packets, power management module 106 may configure the wireless radio and/or one or more transceivers 108 for higher throughput and suspend any power save modes. In other embodiments, when the application and protocol demands on the wireless radio link and/or the one or more wireless transceivers 108 are reduced the power management module 106 may select a power mode that matches the decreased demand. Other embodiments are described and claimed.

To conserve power, mobile computing device 100 may include a plurality of power modes in some embodiments. For example, when applications are busy using the WLAN link for browsing, email or media, for example, it is assumed that a user will desire high throughput and latency performance. Consequently, power management module 106 may configure the wireless radio for higher throughput and suspend any power save modes when it is notified by data traffic monitor module 102 that the applications and user are active on the wireless link using one or more wireless transceivers 108. In some embodiments, when data traffic monitor module 102 determines that application and protocol throughput and latency demands have been reduced, a first power save mode may be selected by power management module 106. In various embodiments, the power save mode may include disabling the one or more wireless transceivers 108 between each wireless beacon event.

In some embodiments, power save mode may comprise an IEEE power saving mechanism as defined in the 802.11 standards. Disabling the one or more wireless transceivers 108 between each wireless beacon event may reduce the power consumption of the mobile computing device 100 where the one or more wireless transceivers 108 typically draw approximately 200-300 mA when powered on and potentially less than 1 mA when in a suspended state. In power save mode, the wireless radio and/or one or more wireless transceivers 108 are awoken to process each beacon transmitted by an access point or other network device. In some embodiments, the beacon processing time interval is about 10 ms. Other embodiments are described and claimed.

In various embodiments, additional power savings may be desired. In some embodiments, data traffic monitor module 102 will continue to monitor data flow and instruct power management module 106 to activate an extended power save mode when the application and protocol demands are further reduced. The extended power save mode may comprise disabling the one or more wireless transceivers 108 during a plurality of consecutive wireless beacon events in some embodiments. For example, the extended power save mode may comprise disabling the one or more wireless transceivers for four consecutive wireless beacon events, or any other number of beacon events that is greater than one. Disabling the one or more wireless transceivers 108 for a plurality of beacon events may result in additional power savings. Other embodiments are described and claimed.

Mobile computing device 100 may include a timing module 104 in various embodiments. Timing module 104 may be operative to detect periods of wireless inactivity from data traffic monitor module 102. For example, the power save mode may be selected after a first time interval and the extended power save mode may be selected after a second time interval. In some embodiments, the second time interval is longer than the first time interval.

In a typical mobile computing device, power save modes may be disabled or suspended when the device is connected to a wired power source or external power supply. In various embodiments, the extended power save mode may be optionally suspended when the mobile computing device is coupled to an external power supply. For example, a user may wish to continue using the power save mode and the extended power save mode even when mobile computing device 100 is connected to an external power supply. Such use may improve the energy efficiency and environmental friendliness associated with the use of mobile computing device 100.

The wireless radio and/or one or more wireless transceivers 108 of mobile computing device 100 must remain synchronized with one or more wireless access points or other network devices to maintain a reliable connection. For example, the one or more wireless transceivers 108 of mobile computing device 100 may need to remain synchronized with the time a wireless access point is transmitting 802.11 beacon frames to reliably receive unicast, multicast and broadcast frames and packets. This may be problematic in extended power save mode where the one or more wireless transceivers are disabled during a plurality of wireless beacon events. Absent corrective measures, it is known that reception of multi-cast and broadcast traffic may be unreliable during periods of extended power save mode. Router address resolution protocol (ARP) frames may not be reliably received during periods of extended power save mode. Furthermore, keeping access point or other network device station tables and network router address tables intact and updated on network routers and access points must also be accomplished during periods of extended inactivity.

In various embodiments, mobile computing device 100 may include a processor 110 to periodically transmit an address resolution protocol (ARP) response to one or more wireless access points or other network devices to maintain a wireless connection between the mobile computing device and the one or more wireless access points or other network devices when the mobile computing device is in the extended power save mode. These gratuitously transmitted ARP responses may be used to maintain an up to date connection with an associated access point or other network device, for example. Other embodiments are described and claimed.

In some embodiments, power management module 106 or processor 110 may direct the wireless radio and/or one or more wireless transceivers 108 to periodically send 802.11 Null data frames to keep the access point connected to the mobile computing device 100. In other embodiments, power management module 106 or processor 110 may direct the wireless radio and/or one or more wireless transceivers 108 to periodically send an ARP frame to keep the network router tables up to date. The automatic transmissions of maintenance frames will, in some embodiments, be coordinated by the power management module 106 or processor 110 to coincide with a normal beacon processing event. In various embodiments, this may have the effect of additionally saving power while taking advantage of the fact that the wireless radio and/or one or more wireless transceivers 108 are already in an operational state and efficiently performing link reliability tasks. Other embodiments are described and claimed.

In various embodiments, the processor 110 may be disabled in addition to or in place of the one or more wireless transceivers 108 to conserve power during the power save modes. The processor 110 may comprise a general purpose processor or an application specific processor arranged to provide general or specific computing capabilities for the mobile computing device 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth. In some embodiments, processor 110 may comprise a communications processor.

Despite entering various power save modes, users may expect the wireless radio and/or one or more wireless transceivers 108 to maintain a connected state to a network as the user moves around an extended service set ID having multiple access points or other network devices. In some embodiments, a user may wish to ascertain the link status and quality of any surrounding wireless networks. To do so, users often look to signal bars presented in the graphical user interface (GUI) and/or a wireless status bar. In various embodiments, processor 110 may be used to notify mobile computing device 100 when movement by the user and mobile computing device 100 has occurred. The notification may be based on a preset minimum distance, for example. Because the wireless radio and/or one or more wireless transceivers 108 typically do not have global positioning system (GPS) functionality for mapping distances, processor 110 may measure the signal strength of a frame transmitted by an access point or other network device to the one or more wireless transceivers 108 of mobile computing device 100, along with a basic path loss formula, to estimate the distance moved.

Processor 110 may maintain a running average of the relative signal strength of the past few received frames and compare that average with thresholds set by system roaming software. In some embodiments, when the average signal strength crosses a threshold, a possible roam event or signal bar event may be indicated to the host software of mobile computing device 100. By monitoring the movement by the user and mobile computing device 100, the processor 110 may not need to be burdened with the fairly repetitive and simple task or repeatedly identifying that the mobile computing device 100 is still connected to the same access point or other network device. In some embodiments, this may result in additional power savings. Other embodiments are described and claimed.

Figure 2:
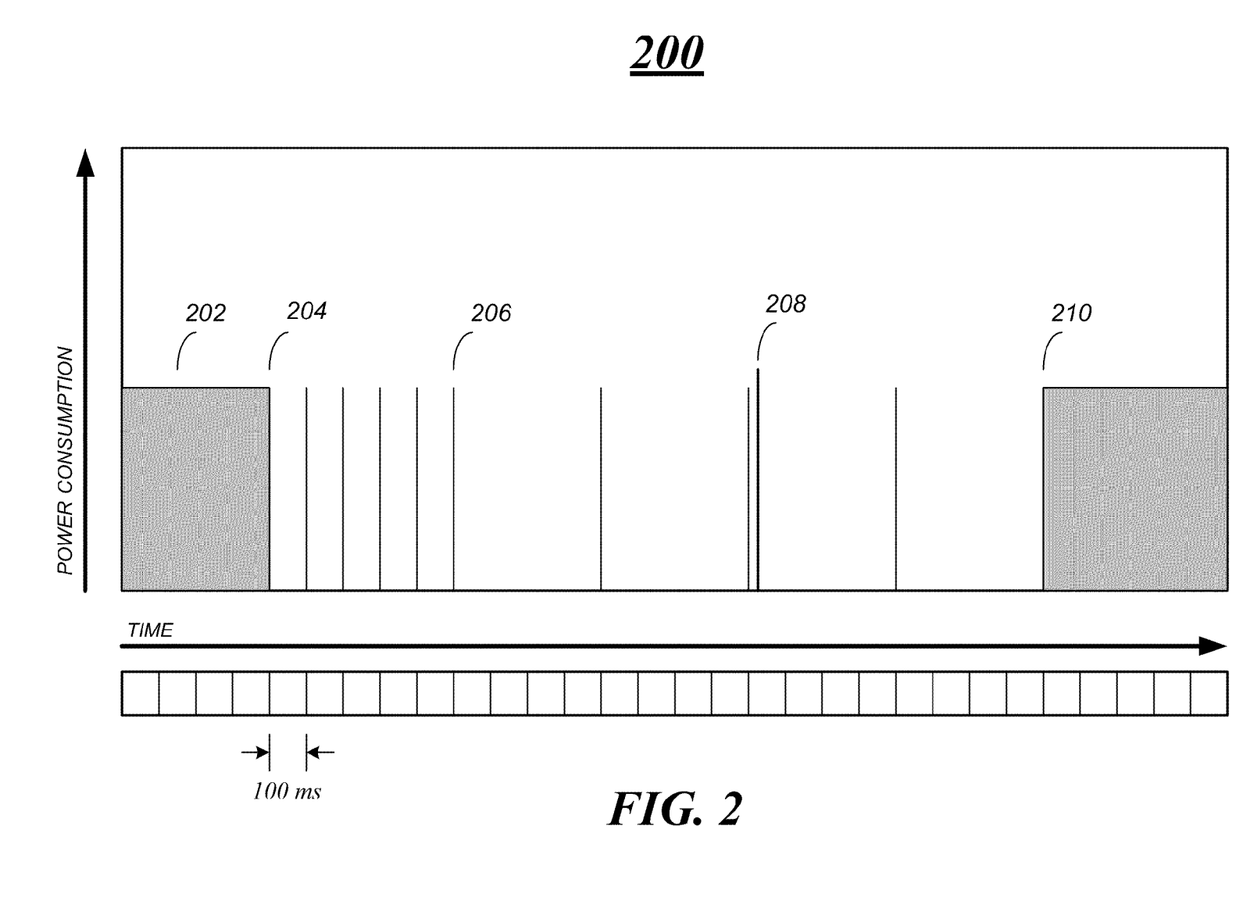
FIG. 2 illustrates one embodiment of a timing diagram.

FIG. 2 illustrates one embodiment of a timing diagram 200. In particular, FIG. 2 shows the power consumption of mobile computing device 100 of FIG. 1, for example, over time in 100 ms intervals. Timing diagram 200 is intended to provide an example of the power mode transitions of mobile computing device 100. It should be understood, however, that timing diagram 200 is illustrative of only one example timing diagram and the embodiments described herein are not limited to the timing diagram illustrated in FIG. 2. Other embodiments are described and claimed.

As shown at 202, mobile computing device 100 may be operating normally with no power save modes enabled. At 204 however, mobile computing device 100 may transition to power save mode as a result of changes in system requirements, for example. As illustrated by the spikes in power consumption between 204 and 206, mobile computing device 100 may utilize a reduced amount of power for 100 ms intervals, for example. In some embodiments, the spikes between 204 and 206 may represent mobile computing device 100 using increased power to ensure reception of transmitted beacon events. For example, the one or more wireless transceivers 108 of mobile computing device 100 may awaken every 100 ms in accordance with scheduled beacon events to maintain a reliable connection.

At 206, mobile computing device 100 may transition into extended power save mode as a result of an additional reduction of system or wireless communication requirements. As shown between 206 and 210, mobile computing device 100 may have even further reduced power requirements in extended power save mode versus power save mode. For example, in extended power save mode, the one or more wireless transceivers 108 and/or processor 110 of mobile computing device 100 may be disabled for longer periods of time in extended power save mode. In some embodiments, the one or more wireless transceivers 108 and/or processor 110 may be disabled for the duration of four beacon events, or the equivalent of 400 ms. The increased time between wake events may greatly reduce the power consumption of mobile computing device 100.

In some embodiments, an ARP response may be transmitted as illustrated by the spike in power consumption at 208. ARP responses may need to be gratuitously sent by processor 110 to one or more wireless access points or other network devices to maintain a wireless connection between the mobile computing device 100 and the one or more wireless access points or other network devices when the mobile computing device is in the extended power save mode. At 210, normal usage, such as web browsing for example, may resume resulting in mobile computing device 100 transitioning out of extended power save mode and back into a normal operating mode. Other embodiments are described and claimed.

The above described embodiments may be implemented in software, hardware or any combination of software and hardware. In some embodiments, the above described functionality may be implemented using the following programming code or algorithms. It should be understood, however, that the following code is presented for purposes of illustration and not limitation. As such, any code may be used to implement the above described functionality and still fall within the described embodiments.

In some embodiments, a Wi-Fi power save mode may be enabled by PmWiFiService by calling SetPalmPowerMgmt. For example:

```
WiFiError_t WiFiDriverController::SetPalmPowerMgmt(bool enable)
{
    WiFiError_t error = kWiFiErrorNone;
    WiFiDriverCommand_t cmd;
    cmd.command = ENGCMD_ENABLE_PALM_PWR_MGMT;
    cmd.data.pwrmgmt.bIsAdaptivePwrMgmtEnabled = enable;
    cmd.data.pwrmgmt.dataPumpInactivityTimeoutMilliSec =
DEFAULT_DATA_PUMP_INACTIVITY_TIMEOUT_MS;
    if (SendPalmCustomIoctl(&cmd) )
    {
        driverLogger.Error("Failed to enable/disable
        palm-power-management");
    }
    return error;
}
```

In various embodiments, IOTCL calls will turn on a master setting of the power management feature and a roaming module controls the details of when the wireless radio, Wi-Fi, and/or one or more wireless transceivers are placed into and out of power save mode. In some embodiments, when the Wi-Fi driver receives the IOCTL, it calls wlan_enable_palm_pwrmgmt_ioctl( ) to enable or disable the power save master setting. A data inactivity timer may be used to signal if that there is no network traffic within the last 250 ms in various embodiments. For example, the timer may be started when the Wi-Fi driver receives or sends and cancelled if traffic is detected. This functionality may be implemented as follows:

```
void WlanPwrMgmt_RxTxPkt(wlan_private* priv)
{
    ....
    // or first pkt after data inactivity.
    // so most likely there is going to be data activity
    // so recover from extreme mode or go to milder mode.
    enableMildPowerSaveMode(priv);
    //start the timer
    startDataInactivityTimer(priv);
    ...
}
ProcessRxedPacket( )
{
    ...
    PmWlanPwrMgmt_RxTxPkt( );
    ...
}
ProcessTxPacket( )
{
    ...
    PmWlanPwrMgmt_RxTxPkt( );
    ...
}
```

In various embodiments, when the data inactivity timer expires, an extended power save timer may be started. The extended power save timer may have a 10 second interval, for example. Also, in some embodiments, the Dtim value may be retrieved from Wi-Fi firmware. This value helps determine the Dtim multiplier. For example:

```
DataInactivityTimerFunction(void *FunctionContext)
{
    ...
    // this is an aysnc command
    getDtimValueFromFirmware(priv);
    startExtremePSTimer(priv);
    ...
}
```

In some embodiments, if network traffic presents within the 10 second period of the extended timer, the extended timer will be cancelled. For example:

```
void WlanPwrMgmt_RxTxPkt(wlan_private* priv)
{
    ...
    // make sure that we cancel extreme PS timer and stop periodic ARP.
    if (pAdapter->PwrMgmtInfo.bIsExtremePSTimerStarted)
    {
        cancelExtremePSTimer(priv);
    }
    if (pAdapter->PwrMgmtInfo.bAutoTxARPConfigured)
    {
        configureAutoTxARP(priv, 0);
        pAdapter->PwrMgmtInfo.bAutoTxARPConfigured = FALSE;
    }
    ...
}
```

In other embodiments, when the time of the extended timer expires, the wireless radio, Wi-Fi and/or one or more wireless transceivers 108 may be placed into extended power save mode by calling enableExtremePowerSaveMode( ). In some embodiments, this function configures the dtimMultiplier so that the firmware will only wake up every 4 beacon intervals. In other embodiments, this function may also set up the gratuitous ARP response packet and send the ARP packets to firmware using an Auto Tx feature. This ARP packet then will be sent automatically by firmware, without interrupting the host, for every 55 seconds in some embodiments. For example:

```
static void EnableExtremePowerSaveMode(wlan_private *priv)
{
  ...
  PmSetPowerSaveParameters(priv,
         dtimMultiplier,
         EXTREME_PS_INACTIVITY_MS);
  ...
  configureAutoTxARP(priv, 1);
}
```

In order to conserve additional power and/or battery life, the driver may employ a feature where it purposely allows the firmware to quickly go back into and stay in power save mode when a broadcast packet is sent or received. For example:

```
ProcessTxPackets(wlan_private * priv)
{
  ...
  // Notify Power Mgmt of data activity, if it's not an ARP pkt
  if (Adapter->CurrentTxSkb->protocol == htons(ETH_P_ARP))
  {
     PRINTM(WARN,"%s: ARP Packet being transmitted. "
        "Skip Palm's Adaptive Pwr Mgmt\n",__FUNCTION__);
  }
  ...
}
ProcessRxedPacket(wlan_private * priv, struct sk_buff *skb)
{
  ...
  if (skb->protocol == htons(ETH_P_ARP))
  {
     notifyPalmPwrMgmt = false;
  }
  //check to see if it's a broadcast pkt
  if (pEthHdr)
  {
     if (memcmp(&pEthHdr->dest_addr, &broadcast_addr,
sizeof(broadcast_addr))== 0)
     {
        notifyPalmPwrMgmt = false;
     }
  }
  ...
}
```

While specific code is described above for purposes of illustration, it should be understood that any code could be used to implement the described functionality and still fall within the described embodiments. Other embodiments are described and claimed.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
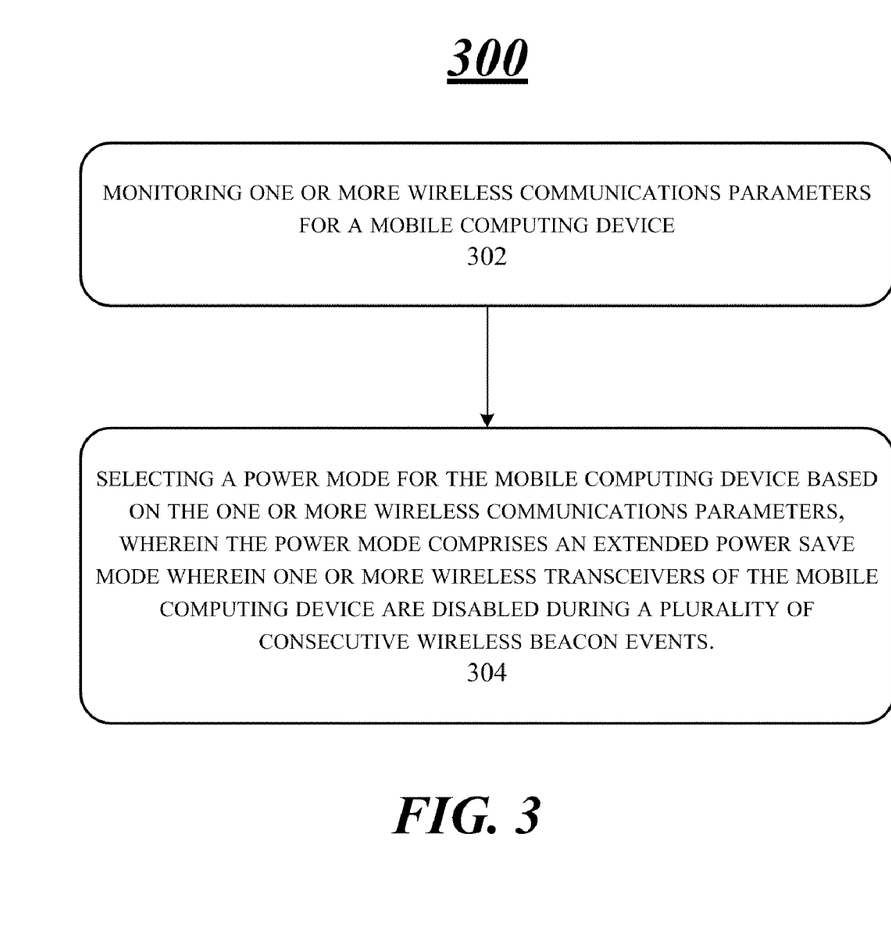
FIG. 3 illustrates one embodiment of a logic diagram.

FIG. 3 illustrates a logic diagram. In particular, FIG. 3 illustrates a logic diagram 300, which may be representative of the operations executed by one or more embodiments described herein. As shown in the FIG. 3, one or more wireless communications parameters for a mobile computing device may be monitored at 302. For example, data traffic monitor module 102 of FIG. 1 may monitor throughput and latency for the one or more wireless transceivers 108 of mobile computing device 100. The one or more communications parameters may comprise one or more of application or protocol demands for the mobile computing device 100 in various embodiments.

At 304 a power mode may be selected for the mobile computing device based on the one or more wireless communications parameters. In some embodiments, the power mode may comprise an extended power save mode wherein one or more wireless transceivers of the mobile computing device, such as wireless transceivers 108 of mobile computing device 100, are disabled during a plurality of consecutive wireless beacon events.

In various embodiments, an address resolution protocol (ARP) response may be transmitted to one or more wireless access points or other network devices to maintain a wireless connection between the mobile computing device and the one or more wireless access points or other network devices when the mobile computing device is in the extended power save mode. For example, processor 110 of mobile computing device 100 may transmit an ARP response to an associated access point or other network device to maintain a connection with the access point or other network device and to ensure that the access point or other network device remains aware of the location of the mobile computing device 100.

The power mode may comprise a power save mode wherein the one or more wireless transceivers are disabled between each wireless beacon event in some embodiments. For example, the one or more wireless transceivers 108 of mobile computing device 100 may be disabled between each beacon event, and may be enabled at predetermined intervals to detect beacon signals. In various embodiments, the power mode may be selected to match a throughput, latency and available power required by mobile computing device 100 based on the one or more communications parameters.

In some embodiments, periods of wireless inactivity may be detected and the power save mode may be selected after a first time interval and the extended power save mode may be selected after a second time interval. The second time interval is longer than the first time interval in various embodiments. For example, after a first time interval, the one or more transceivers 108 of mobile computing device 100 may be disabled between each wireless beacon event. After a second time interval, which is longer than the first time interval, the one or more transceivers 108 may be disabled for a plurality of consecutive wireless beacon events. In some embodiments, the one or more wireless transceivers may be disabled for four consecutive wireless beacon events in the extended power save mode. Other embodiments are described and claimed.

The extended power save mode may be optionally suspended when the mobile computing device is coupled to an external power supply in various embodiments. For example, if a user were to connect mobile computing device 100 to an AC power supply, it may be desirable to optionally continue to utilize the available power saving modes to conserve energy and to use the mobile computing device 100 in a more environmentally friendly manner.

In various embodiments, power savings in addition to the power savings described above may be desired. Various embodiments are described below that may result in additional power savings for a mobile computing device, such as mobile computing device 100 of FIG. 1, for example.

Cached Access Point Discovery

In various embodiments, network discovery may be a time and battery power consuming task. A transceiver, such as the one more wireless transceivers 108, for example, baseband and media access control (MAC) functions may all be involved in the operations of network discovery. In some embodiments, the service of network discovery may involve scanning logic that performs reliable wireless or WLAN scans to perform access point discovery. In various embodiments, theses scans provide an access point address, name and signal strength information to the mobile computing device performing the scan. It may be desirable, in some embodiments, to perform the network discovery service in a more power efficient manner to conserve power.

A typical user scenario may involve, for example, a wireless or Wi-Fi service at a mobile computing device to perform an access point discovery scan and display to the user a list of available networks. In some embodiments, the displayed list may be updated frequently so that the graphical user interface (GUI) experience is responsive. In various embodiments, when the mobile computing device connects to a wireless or WLAN network, the service may perform access point discovery so that it can choose the access point that will provide the best connection at that time. In some embodiments, the service may also perform access point discovery as the mobile computing device moves around an extended service set (ESSID) or corporate network with multiple access points. Access point discovery may be performed at other, un-described times as well.

In various embodiments, a power save feature of the mobile computing device may provide an access point cache or list that is shared by the above described different sub tasks of the discovery service. For example, access point discovery requests made by the service that are less than 3 seconds apart, for example, may use the access point list that is present in the access point cache rather than scanning for new access points. In some embodiments, access points may be aged out from the list over time. For example, the age out of the access point cache may be on the order of 3 seconds. The use of an access point cache in this manner may result in power savings associated with not turning on the transceivers and/or baseband processor to perform additional scanning operations as some of these repetitive operations may be replaced with use of the list of access points in the cache. Other embodiments are described and claimed.

Backed Off Scanning Interval While Searching for Networks

In various embodiments, when searching for wireless access points to connect to, a service of a mobile computing device may initiate a scan interval to ensure that the mobile computing device can connect to a network in a short amount of time, if a network is found. The typical scan interval may comprise 1 second for example. In various embodiments, if no network is discovered during the scan, the service may double the time between successive scans to conserve power. In some embodiments, the time between successive scans may be doubled up to a predetermined limit, such as a predetermined maximum number of seconds, for example.

In some embodiments, for example, a mobile computing device may be searching for an access point with a specific service set identifier (SSID) or network name, such as "Mathilda" for example. The mobile computing device may perform a scan when the wireless or WLAN connection attempt is first initiated. In various embodiments, if a SSID or network name of "Mathilda" is not discovered in range, the next successive scans may take place after 2, 4, 8, 16, 32, and 64 seconds and so on respectively, or until a predetermined threshold has been reached. In various embodiments, the maximum interval can be adjusted to successively back off the scan interval in greater amounts depending on the battery level available on the mobile computing device. Backing off the time between scans may result in additional power savings for the mobile computing device. Other embodiments are described and claimed.

Off Loading Keep Alive and Application Packets to the Communications Processor

In various embodiments, a service of a mobile computing device may need to provide an interface where periodic application oriented packets can be transmitted from the mobile computing device automatically. For example, an email program may need to maintain a connection with an email server so that email can be pushed to the mobile computing device. In various embodiments, this periodic transmission may be offloaded from the host processor to communications processor to conserve power. Other embodiments are described and claimed.

Additional Power Savings While Moving About a Network

In some embodiments, a mobile computing device may be moved around an extended service set identifier (ESSID) or corporate network containing multiple access points. When moved, the mobile computing device may be required to choose a new or different access point to maintain a network connection. In various embodiments, a service of a mobile computing device may program the wireless or WLAN communications processor with received signal strength indicator (RSSI) triggers to assist in this process and to conserve power.

Figure 4A:
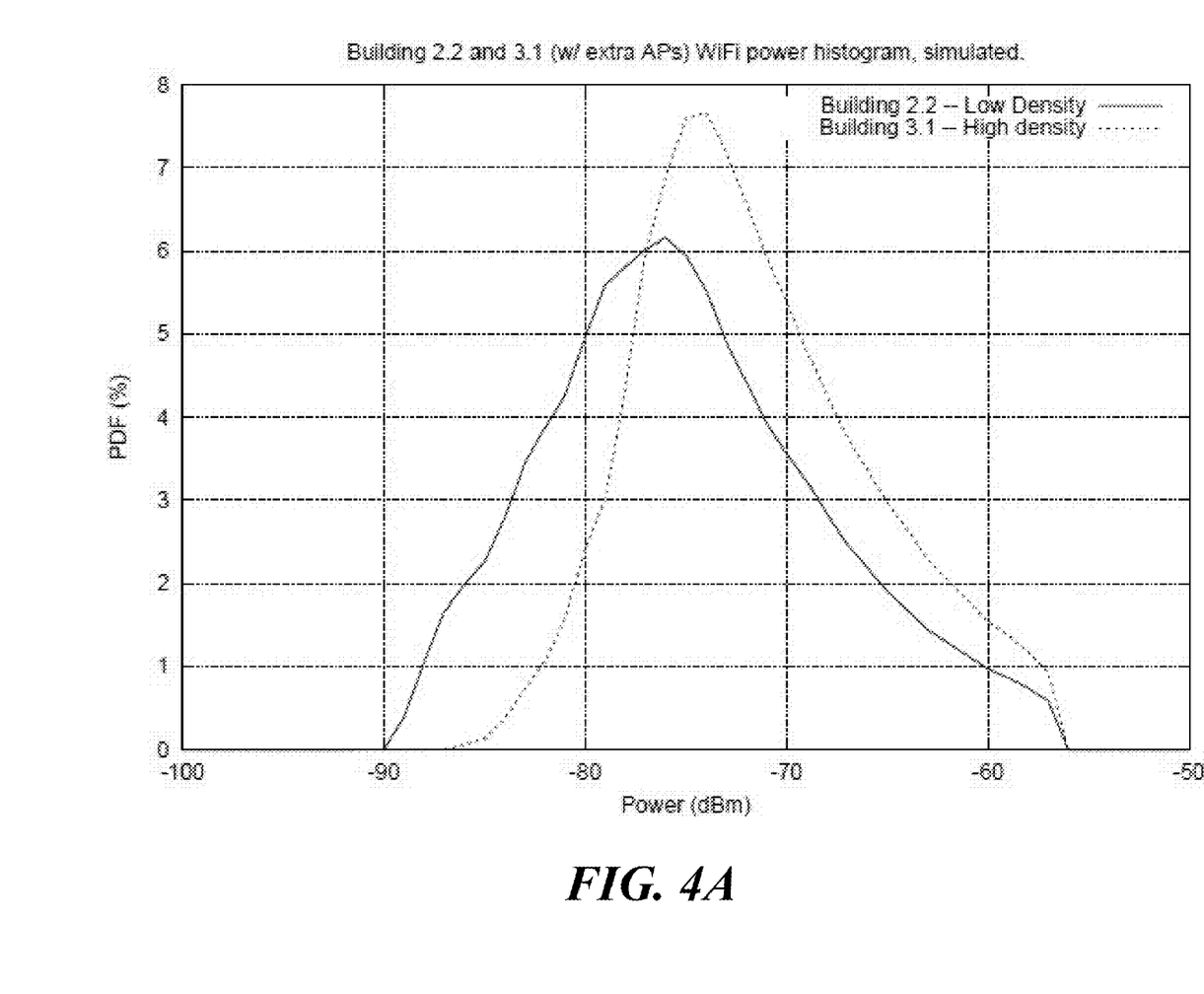
FIG. 4A illustrates one embodiment of a power histogram.

Choosing the correct RSSI triggers requires the creation of models of the wireless or WLAN environment based on different topologies and densities of access points over different areas in various embodiments. For example, the wireless or WLAN environment models may be comprised of discrete states including low and high density access point deployments. Additional states may also exist. FIG. 4A, for example, may illustrate simulated power histograms for two buildings having different topologies and densities of access points in different areas. More particularly, FIG. 4A illustrates power versus probably density function for a Building 2.2 and a Building 3.1. As illustrated, Building 2.2 may comprise low density and Building 3.1 may comprise high density. Other embodiments are described and claimed.

Figure 4B:
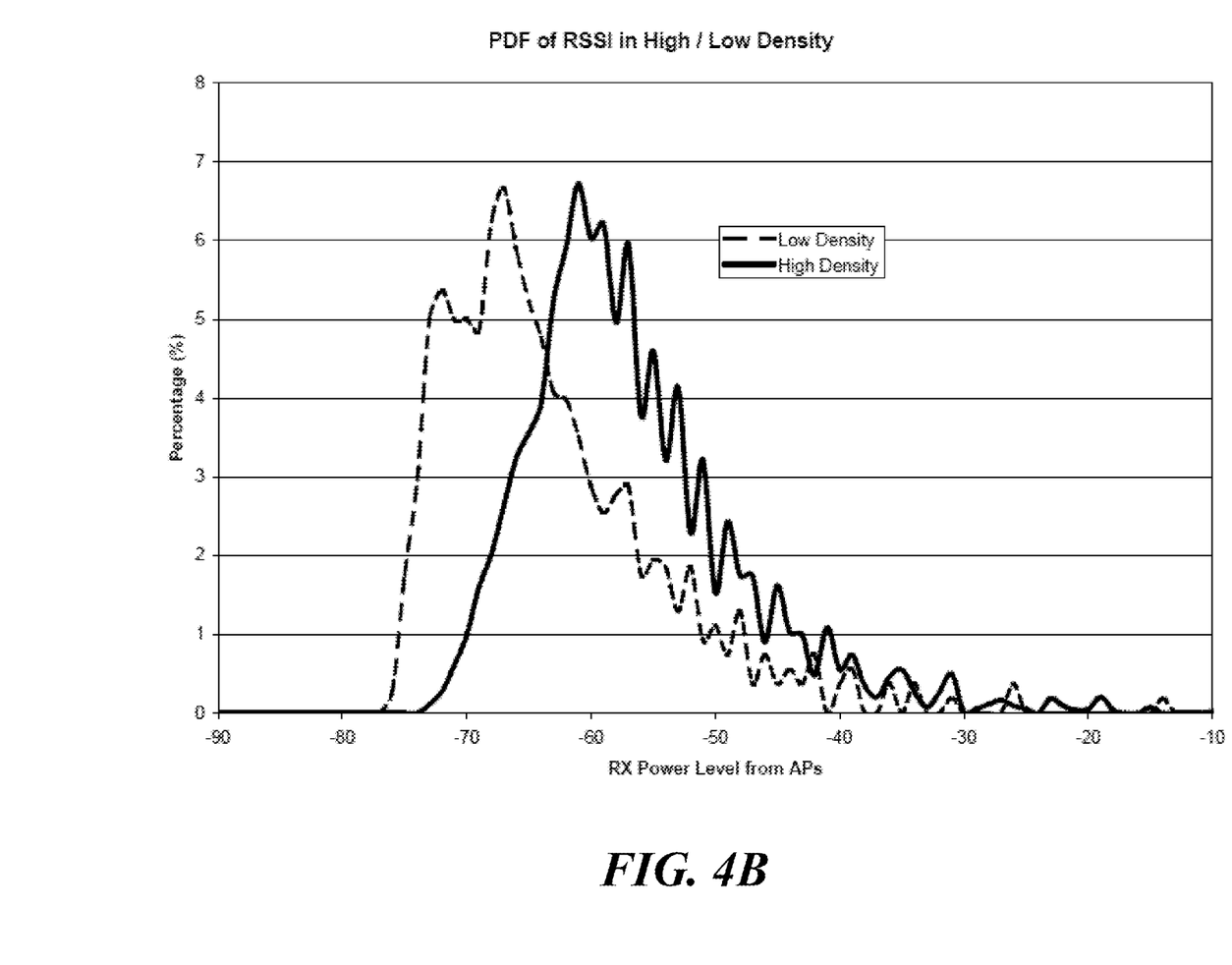
FIG. 4B illustrates one embodiment of a power density factor graph.

In various embodiments, wireless environments, such as the environment illustrated in FIG. 4A, may be modeled, for example, through simulation and by actively and passively scanning networks known to be low and high density access point deployments. The simulations may include, in some embodiments, placement of access points on a grid and then iterating standard path loss formulas to generate tables of signal strengths per access point at different locations. In some embodiments, this type of scanning may be performed at large companies, metropolitan networks, personal networks, public hotspots or different buildings both indoors and outdoors or any other location where a plurality of access points are known to exist. In some embodiments, histograms of the signal strengths provide a mathematical model of the different density access point deployments, as shown in FIG. 4B. More particularly, FIG. 4B illustrates a graph showing probably density function of RSSI in high and low density. The horizontal axis of the graph shows a received power level from an access point and the vertical access illustrates a percentage. Other embodiments are described and claimed.

In various embodiments, probability density functions for different access point density models may be developed. These models may be used, for example, by designers or a service of a mobile computing device to select appropriate RSSI triggers that match the density of the access point deployments. Bayesian inference may be used to train the model to the actual wireless or WLAN environments the mobile computing device is used in, in some embodiments.

By providing appropriate RSSI triggers which invoke scanning operations by the wireless or WLAN radio in the most efficient places of a WLAN environment, power savings may be achieved in various embodiments.

Figure 4C:
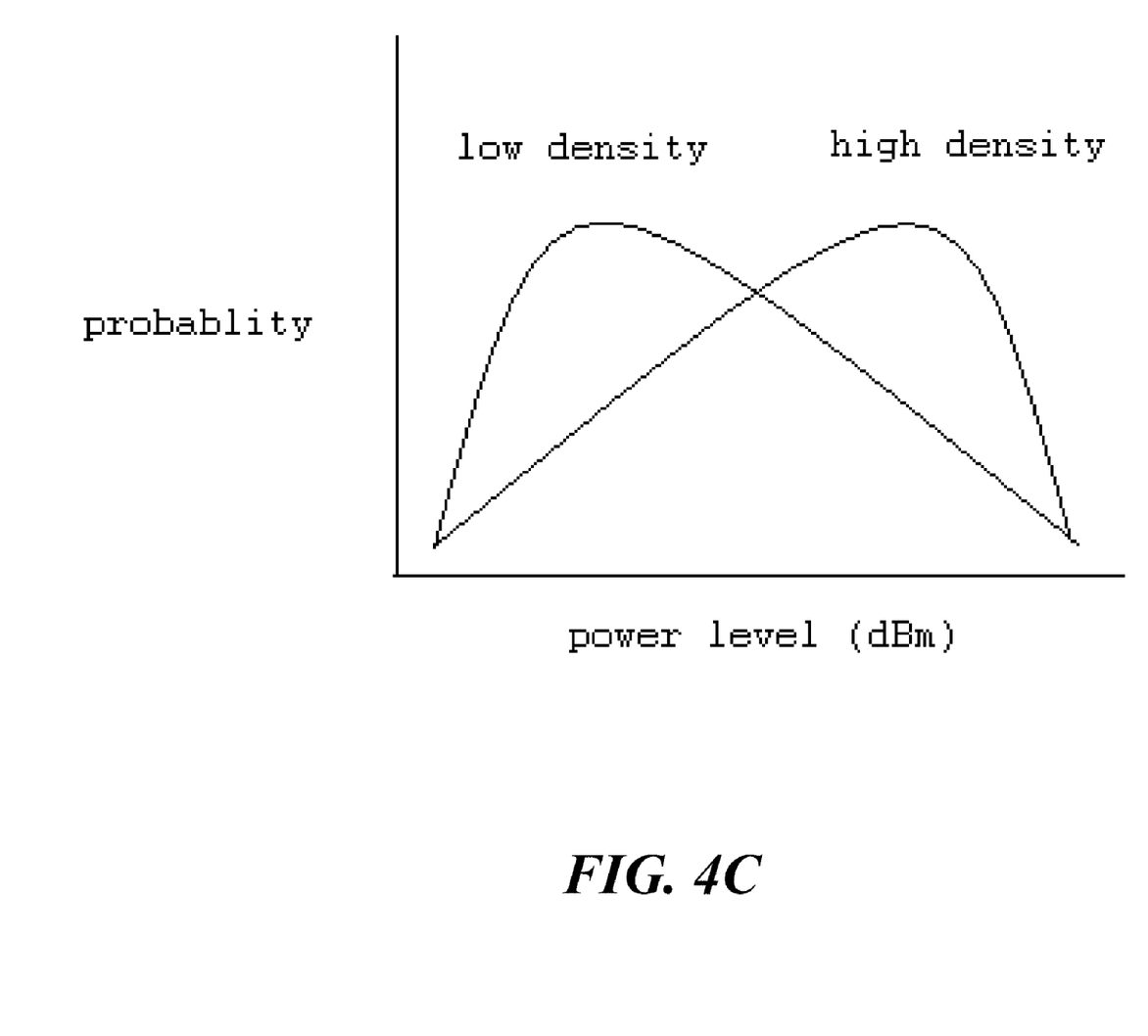
FIG. 4C illustrates one embodiment of a graph of power level versus probability

FIG. 4C illustrates a sample graph showing power level versus probably for high and low density areas. A graph similar to that shown in FIG. 4C may be used, as described above, to select appropriate RSSI triggers to allow a mobile computing device to invoke scanning operations only in the most efficient places of a wireless environment, as illustrated by the peaks of the low and high density curves. Invoking scanning operations only in the most efficient places of a wireless environment may result in power conservation for a mobile computing device because computing power may not be wasted in areas of low access point availability. Other embodiments are described and claimed.

In some embodiments, when a mobile computing device scans for an access point, a list of received signal power levels may be compared to the probability density functions or WLAN environment models. In various embodiments, a Bayesian inference may be used to select the appropriate RSSI triggers by identifying the density of the access point deployment.

Initially, in some embodiments, the probability of being in either topology may be 0.5 but as each RSSI sample is received, the probability may be adjusted according to the formula shown in Equation (1) as follows:

$$P(H_{high} | S) = \frac{P(S | H_{high})P(H_{high})}{P(S | H_{high})P(H_{high}) + P(S | H_{low})P(H_{low})} \quad \text{Equation (1)}$$

where H-high is the high density network hypothesis, H-low is the low density hypotheses and S is the sample RSSI measurement from an AP that is received.

In various embodiments, the resulting value may be used as the P(H high) for the next sample. In this way, the model may adapt as needed and may statically discount samples that do not provide a clear distinction between the two hypotheses. In various embodiments, more than two hypotheses are possible but only two hypotheses are shown for purposes of illustration and not limitation. Other embodiments are described and claimed.

Communications Processor Transmission Parameters

In various embodiments, the above described Bayesian model and inference can help to identify other quality of service parameters. For example, the rate selection algorithm, the frame size, aggregation size and/or packet retry limit can be adjusted to fit the access point deployment density. In various embodiments, adjustments of one or more of these parameters may result in more efficient transmission of frames and additional power savings.

Communication Processor Clocking Speed

In some embodiments, as the power, thermal or Bluetooth coexistence demands change for a mobile computing device, a service of the mobile computing device can change the clock speed at which that the communications MAC, baseband, and/or CPU are running. By adjusting the clock speed separately or together, more power can be saved, less heat may be generated and the overlapping demands with a Bluetooth radio for the shared ISM band can be improved in various embodiments. Other embodiments are described and claimed.

Figure 5:
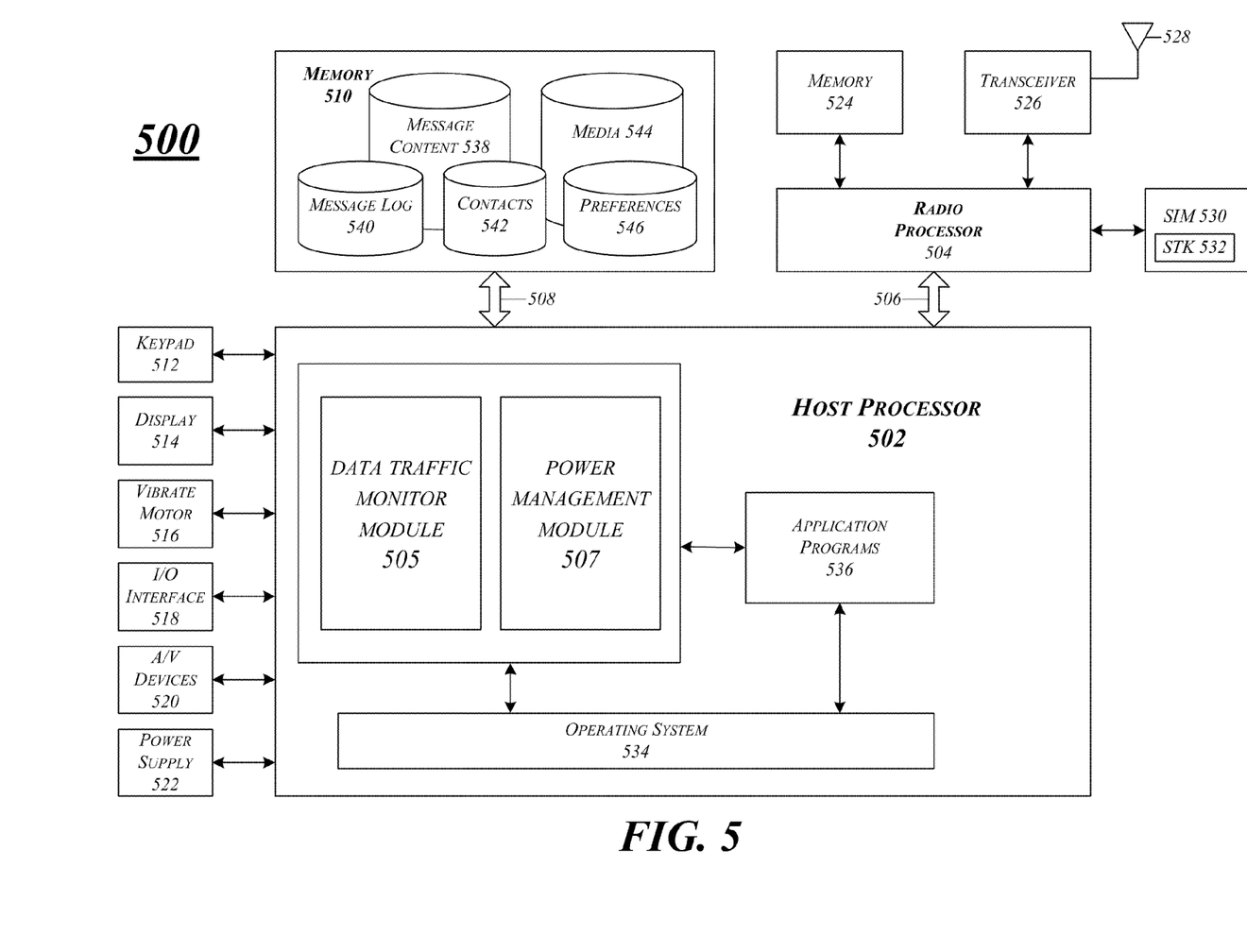
FIG. 5 illustrates one embodiment of a second mobile computing device.

FIG. 5 illustrates a block diagram of a second mobile computing device 500 suitable for implementing various embodiments, including the mobile computing device 100. It may be appreciated that the mobile computing device 500 is only one example of a suitable mobile computing environment and is not intended to suggest any limitation as to the scope of use or functionality of the embodiments. Neither should the mobile computing device 500 be interpreted as having any dependency or requirement relating to any one or combination of components illustrated in the exemplary mobile computing device 500.

The host processor 502 (e.g., similar to the processor 110) may be responsible for executing various software programs such as system programs and applications programs to provide computing and processing operations for the mobile computing device 500. The radio processor 504 may be responsible for performing various voice and data communications operations for the mobile computing device 500 such as transmitting and receiving voice and data information over one or more wireless communications channels. Although the mobile computing device 500 is shown with a dual-processor architecture, it may be appreciated that the mobile computing device 500 may use any suitable processor architecture and/or any suitable number of processors or number of processor cores in accordance with the described embodiments. In one embodiment, for example, the processors 502, 504 may be implemented using a single integrated processor.

The host processor 502 may be implemented as a host central processing unit (CPU) using any suitable processor or logic device, such as a as a general purpose processor. The host processor 502 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 502 may be coupled through a memory bus 508 to a memory 510. The memory bus 508 may comprise any suitable interface and/or bus architecture for allowing the host processor 502 to access the memory 510. Although the memory 510 may be shown as being separate from the host processor 502 for purposes of illustration, it is worthy to note that in various embodiments some portion or the entire memory 510 may be included on the same integrated circuit as the host processor 502. Alternatively, some portion or the entire memory 510 may be disposed on an integrated circuit or other medium (e.g., hard disk drive) external to the integrated circuit of the host processor 502. In various embodiments, the mobile computing device 500 may comprise an expansion slot to support a multimedia and/or memory card, for example.

The memory 510 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 500 may comprise an alphanumeric keypad 512 coupled to the host processor 502. The keypad 512 may comprise, for example, a QWERTY key layout and an integrated number dial pad. The mobile computing device 500 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 512 may comprise a physical keypad using hard buttons, or a virtual keypad using soft buttons displayed on a display 514. The keypad may also comprise a thumbboard.

The mobile computing device 500 may comprise a display 514 coupled to the host processor 502. The display 514 may comprise any suitable visual interface for displaying content to a user of the mobile computing device 500. In one embodiment, for example, the display 514 may be implemented by a liquid crystal display (LCD) such as a touch-sensitive color (e.g., 56-bit color) thin-film transistor (TFT) LCD screen. The touch-sensitive LCD may be used with a stylus and/or a handwriting recognizer program.

The mobile computing device 500 may comprise a vibrate motor 516 coupled to the host processor 502. The vibrate motor 516 may be enable or disabled according to the preferences of the user of the mobile computing device 500. When enabled, the vibrate motor 516 may cause the mobile computing device 500 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 500 may comprise an input/output (I/O) interface 518 coupled to the host processor 502. The I/O interface 518 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 500 may be arranged to synchronize information with a local computer system.

The host processor 502 may be coupled to various audio/video (A/V) devices 520 that support A/V capability of the mobile computing device 500. Examples of A/V devices 520 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 502 may be coupled to a power supply 522 arranged to supply and manage power to the elements of the mobile computing device 500. In various embodiments, the power supply 522 may be implemented by a rechargeable battery, such as a removable and rechargeable lithium ion battery to provide direct current (DC) power, and/or an alternating current (AC) adapter to draw power from a standard AC main power supply.

The radio processor 504 may be arranged to communicate voice information and/or data information over one or more assigned frequency bands of a wireless communication channel. The radio processor 504 may be implemented as a communications processor using any suitable processor or logic device, such as a modem processor or baseband processor. The radio processor 504 may also be implemented as a digital signal processor (DSP), media access control (MAC) processor, or any other type of communications processor in accordance with the described embodiments. The radio processor 504 may perform analog and/or digital baseband operations for the mobile computing device 500. For example, the radio processor 504 may perform digital-to-analog conversion (DAC), analog-to-digital conversion (ADC), modulation, demodulation, encoding, decoding, encryption, decryption, and so forth.

The mobile computing device 500 may comprise a memory 524 coupled to the radio processor 504. The memory 524 may be implemented using any of the computer-readable media described with reference to the memory 510. The memory 524 may be typically implemented as flash memory and synchronous dynamic random access memory (SDRAM). Although the memory 524 may be shown as being separate from the radio processor 504, some or all of the memory 524 may be included on the same IC as the radio processor 504.

The mobile computing device 500 may comprise a transceiver module 526 coupled to the radio processor 504. The transceiver module 526 may comprise one or more transceivers, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 526 may comprise one or more transceivers arranged to support voice communications and/or data communications for the wireless network systems or protocols as previously described. In some embodiments, the transceiver module 526 may further comprise a Global Positioning System (GPS) transceiver to support position determination and/or location-based services.

The transceiver module 526 generally may be implemented using one or more chips as desired for a given implementation. Although the transceiver module 526 may be shown as being separate from and external to the radio processor 504 for purposes of illustration, it is worthy to note that in various embodiments some portion or the entire transceiver module 526 may be included on the same integrated circuit as the radio processor 504. The embodiments are not limited in this context.

The mobile computing device 500 may comprise an antenna system 528 for transmitting and/or receiving electrical signals. As shown, the antenna system 528 may be coupled to the radio processor 504 through the transceiver module 526. The antenna system 528 may comprise or be implemented as one or more internal antennas and/or external antennas, such as antenna 112 of mobile computing device 100.

The mobile computing device 500 may comprise a subscriber identity module (SIM) 530 coupled to the radio processor 504. The SIM 530 may comprise, for example, a removable or non-removable smart card arranged to encrypt voice and data transmissions and to store user-specific data for allowing a voice or data communications network to identify and authenticate the user. The SIM 530 also may store data such as personal settings specific to the user. In some embodiments, the SIM 530 may be implemented as an UMTS universal SIM (USIM) card or a CDMA removable user identity module (RUIM) card. The SIM 530 may comprise a SIM application toolkit (STK) 532 comprising a set of programmed commands for enabling the SIM 530 to perform various functions. In some cases, the STK 532 may be arranged to enable the SIM 530 to independently control various aspects of the mobile computing device 500.

As mentioned above, the host processor 502 may be arranged to provide processing or computing resources to the mobile computing device 500. For example, the host processor 502 may be responsible for executing various software programs including system programs such as operating system (OS) 534 and application programs 536. System programs generally may assist in the running of the mobile computing device 500 and may be directly responsible for controlling, integrating, and managing the individual hardware components of the computer system. The OS 534 may be implemented, for example, as a WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 500 may comprise other system programs such as device drivers, programming tools, utility programs, software libraries, application programming interfaces (APIs), and so forth.

Application programs 536 generally may allow a user to accomplish one or more specific tasks. In various implementations, the application programs 536 may provide one or more graphical user interfaces (GUIs) to communicate information between the mobile computing device 500 and a user. In some embodiments, application programs 536 may comprise upper layer programs running on top of the OS 535 of the host processor 502 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 536 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 500 may implement other types of applications in accordance with the described embodiments.

The host processor 502 may include a data traffic monitor module 504 and a power management module 507 in some embodiments. The data traffic monitor module 504 and power management module 507 may the same or similar to the data traffic monitor module 102 and the power management module 106 described with reference to FIG. 1, for example.

The mobile computing device 500 may include various databases implemented in the memory 510. For example, the mobile computing device 500 may include a message content database 538, a message log database 540, a contacts database 542, a media database 544, a preferences database 546, and so forth. The message content database 538 may be arranged to store content and attachments (e.g., media objects) for various types of messages sent and received by one or more messaging applications. The message log 540 may be arranged to track various types of messages which are sent and received by one or more messaging applications. The contacts database 542 may be arranged to store contact records for individuals or entities specified by the user of the mobile computing device 500. The media database 544 may be arranged to store various types of media content such as image information, audio information, video information, and/or other data. The preferences database 546 may be arranged to store various settings such as rules and parameters for controlling the operation of the mobile computing device 500.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   one or more wireless transceivers;
   a data traffic monitor module to monitor one or more wireless communications parameters; and
   a power management module to select a power mode for the mobile computing device based on the one or more wireless communications parameters, the power mode comprising an extended power save mode wherein the one or more wireless transceivers are disabled during a plurality of consecutive wireless beacon events.

2. The mobile computing device of claim 1, further comprising a communications processor to periodically transmit an address resolution protocol (ARP) response to one or more wireless access points or other network devices to maintain a wireless connection between the mobile computing device and the one or more wireless access points or other network devices when the mobile computing device is in the extended power save mode.

3. The mobile computing device of claim 1, the power mode comprising a power save mode wherein the one or more wireless transceivers are disabled between each wireless beacon event.

4. The mobile computing device of claim 3, further comprising:
   a timing module to detect periods of wireless inactivity, wherein the power save mode is selected after a first time interval and the extended power save mode is selected after a second time interval and wherein the second time interval is longer than the first time interval.

5. The mobile computing device of claim 1, wherein the extended power save mode disables the one or more wireless transceivers for four consecutive wireless beacon events.

6. The mobile computing device of claim 1, wherein the extended power save mode is optionally suspended when the mobile computing device is coupled to an external power supply.

7. The mobile computing device of claim 1, wherein the power mode is selected to match a throughput, latency and available power required by the mobile computing device based on the one or more communications parameters.

8. The mobile computing device of claim 1, wherein the one or more communications parameters comprising one or more of application or protocol demands for the mobile computing device.

9. A method, comprising:
   monitoring one or more wireless communications parameters for a mobile computing device; and
   selecting a power mode for the mobile computing device based on the one or more wireless communications parameters, the power mode comprising an extended power save mode wherein one or more wireless transceivers of the mobile computing device are disabled during a plurality of consecutive wireless beacon events.

10. The method of claim 9, further comprising:
    periodically transmitting an address resolution protocol (ARP) response to one or more wireless access points or other network devices to maintain a wireless connection between the mobile computing device and the one or more wireless access points or other network devices when the mobile computing device is in the extended power save mode.

11. The method of claim 9, the power mode comprising a power save mode wherein the one or more wireless transceivers are disabled between each wireless beacon event.

12. The method of claim 11, further comprising:
    detecting periods of wireless inactivity; and
    selecting the power save mode after a first time interval and selecting the extended power save mode after a second time interval, wherein the second time interval is longer than the first time interval.

13. The method of claim 9, wherein the extended power save mode disables the one or more wireless transceivers for four consecutive wireless beacon events.

14. The method of claim 9, further comprising:
    suspending the extended power save mode when the mobile computing device is coupled to an external power supply.

15. The method of claim 9, wherein the power mode is selected to match a throughput, latency and available power required by the mobile computing device based on the one or more communications parameters.

16. The method of claim 9, the one or more communications parameters comprising one or more of application or protocol demands for the mobile computing device.

17. An article of manufacture comprising a computer-readable storage medium containing instructions that when executed by a processor enable a system to:
    monitor one or more wireless communications parameters for a mobile computing device;
    select a power mode for the mobile computing device based on the one or more wireless communications parameters, the power mode comprising an extended power save mode wherein one or more wireless transceivers of the mobile computing device are disabled during a plurality of consecutive wireless beacon events; and
    periodically transmit an address resolution protocol (ARP) response to one or more wireless access points or other network devices to maintain a wireless connection between the mobile computing device and the one or more wireless access points or other network devices when the mobile computing device is in the extended power save mode.

18. The article of manufacture of claim 17, further comprising instructions that when executed by the processor enable the system to:
    detect periods of wireless inactivity; and select a power save mode after a first time interval and select the extended power save mode after a second time interval, wherein the second time interval is longer than the first time interval.

19. The article of manufacture of claim 17, further comprising instructions that when executed by the processor enable the system to:

disable the one or more wireless transceivers for four consecutive wireless beacon events in the extended power save mode.

20. The article of manufacture of claim 17, further comprising instructions that when executed by the processor enable the system to:

select the power mode to match a throughput, latency and available power required by the mobile computing device based on the one or more communications parameters.

* * * * *